Feb. 7, 1939.  R. HIGGINS  2,146,069
METHOD AND APPARATUS FOR TESTING INSULATION
Filed July 10, 1937  2 Sheets-Sheet 1
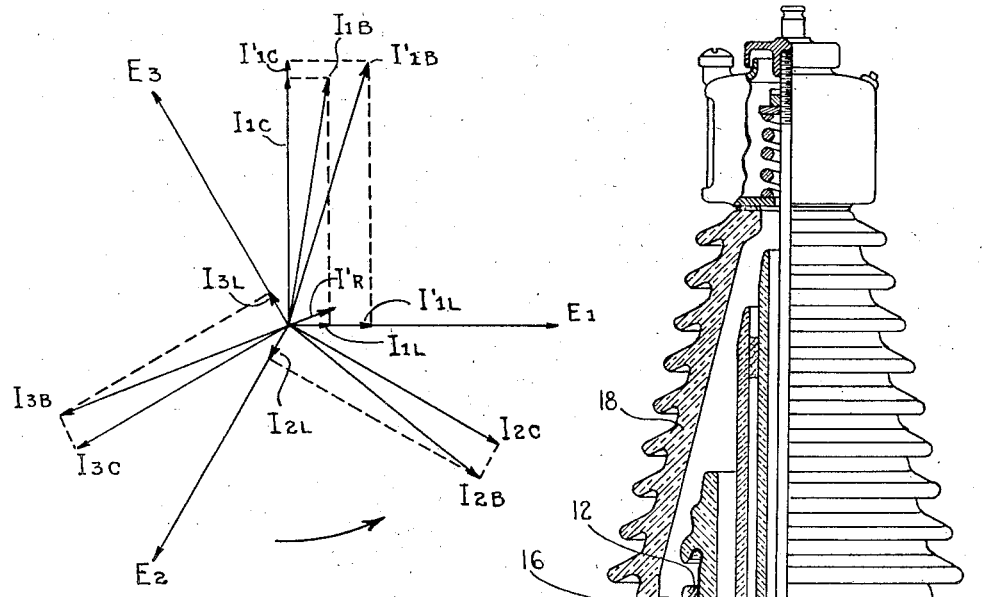
FIG. 2
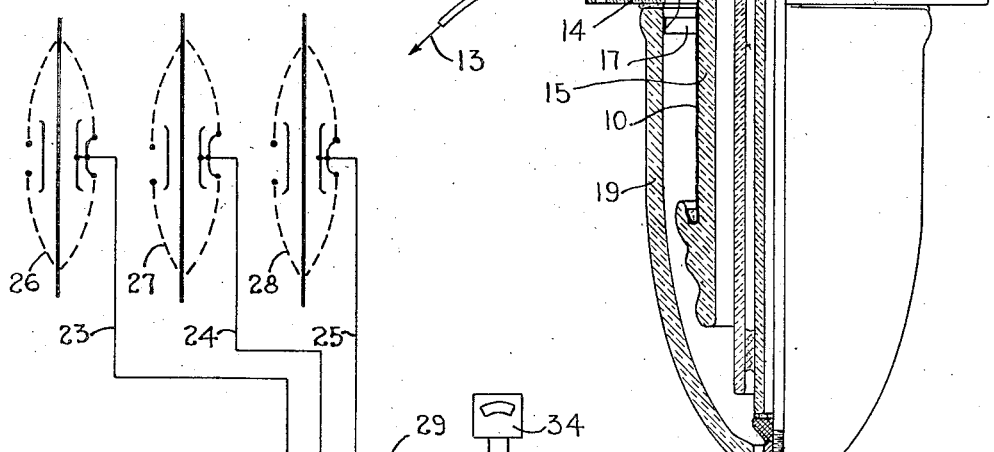
FIG. 3
FIG. 1
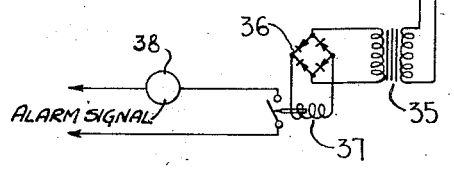
INVENTOR
Ralph Higgins
BY
ATTORNEY

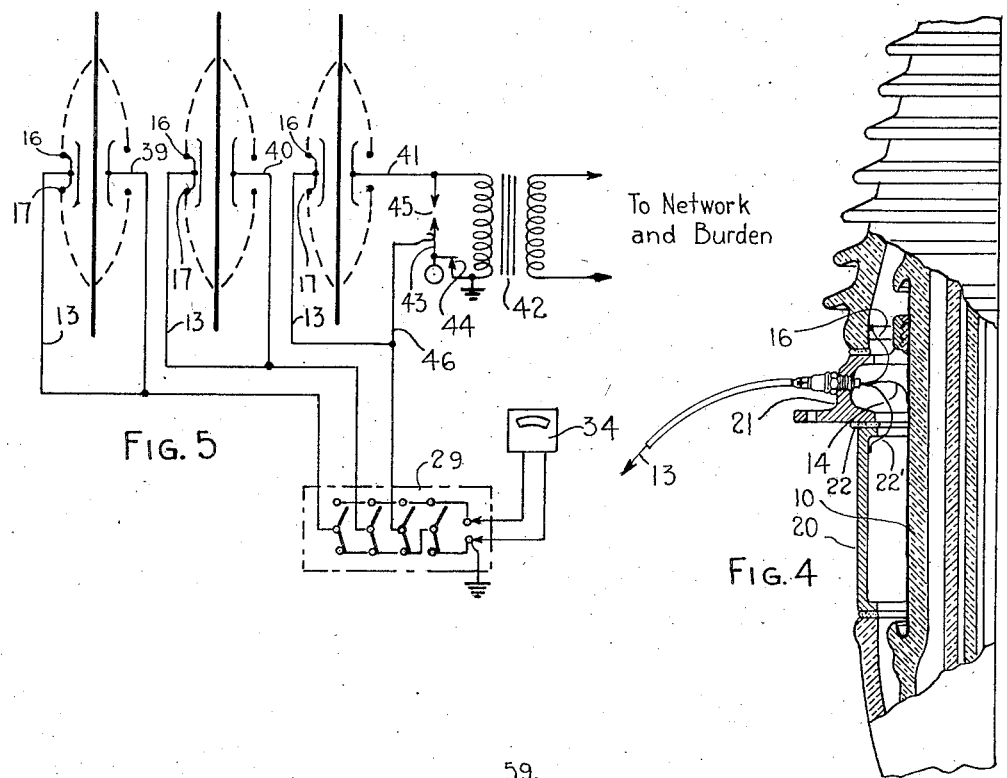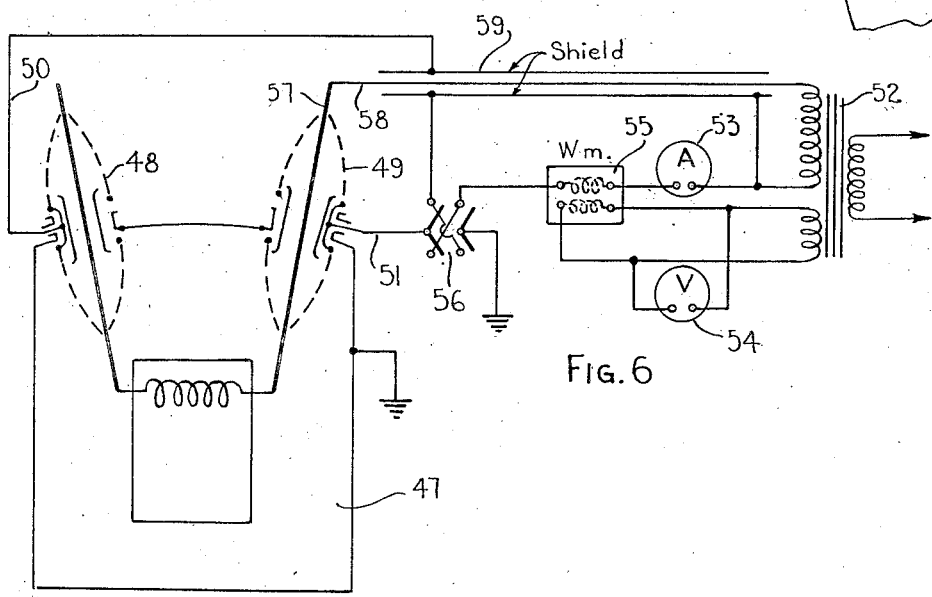

Patented Feb. 7, 1939

2,146,069

UNITED STATES PATENT OFFICE 2,146,069

METHOD AND APPARATUS FOR TESTING INSULATION

Ralph Higgins, Akron, Ohio, assignor to The Ohio Brass Company, Mansfield, Ohio, a corporation of New Jersey Application July 10, 1937, Serial No. 152,971

14 Claims. (Cl. 175—183)

This invention relates to a method and apparatus for testing the condition of insulation, and particularly, of insulation in high potential bushing insulators.

One object of the invention is to provide a method and apparatus for testing bushing insulation while the bushings are in operation.

A further object of the invention is to provide a method and apparatus for testing bushing insulation which will give a more accurate indication of the condition of the insulation than has been given by any methods and apparatus heretofore used.

A further object of the invention is to provide a method and apparatus for testing insulation which will be simple and easy to apply and which will be relatively inexpensive.

A further object of the invention is to provide an arrangement for testing bushing insulation which will eliminate the effect of temperature variations on the results obtained.

A further object of the invention is to provide insulation testing apparatus which shall be of improved construction and operation and to provide an improved method of testing insulation.

Other objects and advantages will appear from the following description.

The invention is exemplified by the combination and arrangement of parts shown in the accompanying drawings and described in the following specification and by the steps of the method explained in the specification. The invention is more particularly pointed out in the appended claims.

In the drawings:

Fig. 1 is an elevation of a bushing insulator partly in section showing one arrangement of apparatus for practicing the present invention.

Fig. 2 is a vector diagram illustrating the magnitude and phase angle relation of the ground currents of bushing insulators of a polyphase system and showing the effect of defective insulation in one of the bushings.

Fig. 3 is a diagram showing a network for connecting bushing insulators of a polyphase system for practicing the present invention.

Fig. 4 is a fragmentary elevation with parts in section showing a modified arrangement for measuring the external as well as the internal leakage current on the lower shell of the bushing insulator.

Fig. 5 is a diagram showing a network for testing a plurality of bushings having capacitance taps.

Fig. 6 is a diagram showing a connection for applying the present invention to apparatus bushings, the connection being arranged to effect separate measurement of the power factor of the apparatus and of the bushings.

The method of field testing of bushings to detect deterioration before failure results, heretofore usually employed has been to measure the power factor of the bushing as a whole. The various sets now in use for this sort of testing are all quite complicated, thus requiring a large amount of bulky equipment to be transported from place to place, and ofttimes, considerable time is required to take a single measurement. Also, it has been found that this method can only be used in perfectly dry weather and with the equipment containing these bushings to be tested deenergized from service and in most cases it is necessary to disconnect the bushings entirely from the equipment before the test can be made. Hence, as a rule, when this test is made the bushings are in a fairly cold condition. This is one of the main drawbacks to the power factor scheme for testing bushings, since at the start of any insulation deterioration in a bushing, especially that caused by the presence of moisture, this condition can only be detected when the bushing is at a relatively high temperature.

In tests made according to the present invention, it is not necessary to de-energize the bushings from service, and thus, the test can be made when the bushings are at their maximum operating temperatures as in the hottest part of the day, or when the bushings and equipment are carrying their maximum load current. For field testing using this method, only a small portable instrument is required. This may be the same kind of instrument that is now being used by some power companies in testing suspension and pillar insulators or the like and suitable for measuring small currents. The cost of this instrument is only a small fraction of that of a reliable power factor test set. Naturally, this scheme as outlined later, requires very little time to make the necessary test. Another advantage of this new scheme is that means can be readily provided, if so desired, to show a continuous indication of the bushing's dielectric condition at all times and under all normal weather conditions.

Also, with the bushings adapted for this proposed scheme, it is possible to use the power factor test method or any other similar scheme to check the insulation of the apparatus or equipment containing the bushings without disconnecting the bushings from the equipment, and at the same time, check internal insulation of the bushings separately, if so desired.

To use this scheme, it is necessary to equip each bushing with a comparatively inexpensive tap through the flange which we shall call a "shield tap," in order to distinguish this tap from the so-called "capacitance tap" sometimes provided on bushings as a source of low voltage energy. The shield tap need only be insulated for a few hundred volts as compared with several thousand volts required for the capacitance tap. Fig. 1 of the drawings shows one method of applying the shield tap to a standard oil filled bushing. In this case the bushing ground shield 10 is insulated from the supporting flange 11 by means of an insulating cement 12 and connected to the shield tap 13 by a jumper 14 soldered or otherwise electrically connected to the ground shield 10 which is a metal coating on the porcelain keg 15. The shield tap 13 is also connected to narrow metallized zones 16 and 17 on the inside of the upper and lower porcelain shells 18 and 19 respectively, adjacent the flange 11 as shown.

Thus, it is seen that when the bushing is energized the bushing ground current as taken from the shield tap 13 will consist of both the capacitance charging current and the leakage currents over the tube assemblies and over the insides of the upper and lower porcelain shells. It is noted here that the external leakage currents will not be measured by any connection to the shield tap, hence, only the internal bushing current can be measured by this form of connection. As a rule, it is only the internal insulation of the bushing that needs to be checked for deterioration. The upper porcelain cones on all oil filled bushings are cleaned periodically when their appearance shows that such is required. When the bushings are installed on such apparatus as power transformers, any deposit on the outside of the lower porcelain shield or dome is apt to be very small and so can be disregarded. However, on all oil circuit breakers and the like where there is apt to be sludge deposit etc. on the outside of the lower dome of the bushing, the arrangement shown in Fig. 4 may be used.

On this class of service, bushings having a ground sleeve construction as shown in my prior Patent Number 2,082,055 and as illustrated in Fig. 4 of the drawings are generally used. Here the ground sleeve 20, which is made a separate member from the flange 21, may be insulated from the flange by a heavy resilient insulating gasket 22 made of any suitable insulating material, one suitable material being sold on the market under the trade name "Corprene" and consisting of fine grains of cork with an oil resistant rubber substitute as a binder. Thus, it is seen that with this ground sleeve electrically connected to the shield tap 13 by the jumper 22', it is possible to measure both the internal and external leakage currents over the lower end of the bushing, when such is desired and with the ground shield 10 and the metallized zone 16 also connected to the shield tap 13 and the entire leakage and charging current for the bushing can be measured including the external leakage current over the lower shell.

It has been found that the magnitude and phase angle of the bushing charging current will be subject to considerable variation due to variation in the temperature of the dielectric medium, even when the insulation is in good condition, hence such measurements of the bushing current alone cannot be used to predict the true state of the insulation, unless the temperature of the bushing is taken as well. Since it is usually not practical and also somewhat hazardous to measure the temperature of the bushing while energized, the present invention also contemplates means to eliminate this effect of temperature variation by connecting the shield taps of three similar bushings, as on any three phase equipment, through a common lead to ground.

As shown in the vector diagram Fig. 2, the bushing charging currents ($I_{1B}$, $I_{2B}$ and $I_{3B}$) of three bushings on the respective phases of a three phase system, may each be broken up into two components. One component ($I_{1C}$, $I_{2C}$ and $I_3^C$) represents the capacitance charging current which will lead the impressed voltage ($E_1$, $E_2$ and $E_3$) by 90°. The other component of each ($I_{1L}$, $I_{2L}$ and $I_{3L}$) represents the loss component in phase with the impressed voltages. This loss current in each is a summation of dielectric loss current and the various leakage currents of the bushing. It is seen that, when the capacitance and loss currents from each of the three bushings are all equal as in the case of similar bushings and at the same operating temperatures, their vector sum will be zero.

In the case of some insulation deterioration starting in one bushing, the loss current, as shown by the vector $I'_{1L}$, will increase in much greater proportion than the capacitance current, as shown by $I'_{1C}$. It is seen that this will produce a pronounced shift in the phase angle relation of the total bushing current ($I'_{1B}$) with only a slight increase in the magnitude. Hence, any readings taken which measure only the value of each bushing current will not show any pronounced discrepancy between the three readings, and so the defective bushing may be passed up. However, the resultant vector sum ($I'_R$) of the three bushing currents ($I_{1B}$, $I_{2B}$ and $I_{3B}$) now becomes a sizable magnitude that may be readily measured by any suitable sensitive meter connected in the common lead to ground.

In practice, it has been found that, as a rule, the insulation of some one bushing of any set will start to show signs of deterioration much ahead of the other two. However, the above scheme is still applicable even if two bushings should start at about the same time.

As shown in Fig. 3, to facilitate rapid field testing of bushings while in service, it is proposed to connect the shield tap leads 23, 24 and 25 from each of the bushings 26, 27 and 28 of a particular set, through a shielded cable to a small junction box 29 containing a gang of instrument or plug switches 30, 31, 32 and 33. These switches may be of the usual type used on current transformer secondary leads on which contact is made on one throw before the other throw is broken. By attaching the portable instrument 34 as shown, and throwing the switches to connect the instrument between the common lead for the shield taps for the three bushings, and ground, it is possible to measure quickly, first, the resulting current from the three bushings. If the reading obtained is very small or negligible, one can then proceed to check the next set of bushings. However, if the resultant current is much larger than ordinarily to be expected, then it is possible quickly to measure the magnitude of the current from each bushing in turn. The bushing, thus showing the largest magnitude of charging current may then be marked as needing possible attention.

Fig. 3 also shows means to provide a continuous indication of any start of insulation deterioration. Any sensitive relay scheme may be employed, but a practical scheme as shown here consists of a small step up current transformer 35 having its secondary connected to a rectifier bank 36 to excite a sensitive D. C. relay 37. This relay may be used to operate an indicating light 38 or other means suitable to give the needed alarm signal.

Fig. 5 shows a modification used when the invention is applied to bushings having a standard capacitance tap connection. With this arrangement, the shield tap 13 on such bushings need only be connected normally to the metallized shield zones 16 and 17 on the upper and lower porcelain shells. The standard capacitance taps 39, 40 and 41 can be used to provide the connections to the internal ground shields of the bushings. In Fig. 5 the capacitance tap of only one bushing is shown in connection with a step down transformer 49 to provide the usual source of low voltage energy required, but it will be understood that either one or both of the other bushings may be likewise equipped. When bushings do not have the capacitance tap connected to a step down transformer the lead from the tap shield may be connected directly to the capacitance lead as shown. In order to apply this scheme of testing bushings having capacitance taps in service, it will be necessary to de-energize the step down transformer and its connected burden before making the test. As a rule, in most installations, the step down transformer burden consists only of a synchroscope and an indicating voltmeter or other instruments requiring periodic operation, hence a short shutdown of these instruments will offer no serious objection. To accomplish this, the grounding switch 43 for the transformer primary is provided with an arrangement such that when closed, the normal ground connection 44 is broken and the secondary is then grounded through the closed protection gap 45 to the test lead 46 as shown. This scheme may be readily applied to any plunger type combination of grounding switch and protective gap as shown in my prior Patent #1,937,148. The circuit, when the switch 44 is open and the gap 45 is closed, operates practically the same as that shown in Fig. 3. It has been found unnecessary to disconnect the step down transformer itself during the test, due to the extremely high impedance of this circuit.

Fig. 6 shows a typical arrangement of the invention whereby it is possible to measure the insulation of any high voltage equipment by the power factor test method without disconnecting the high voltage bushings, when these bushings are equipped with shield taps as previously described.

In the diagram the numeral 47 designates the housing of some form of electrical apparatus such as a transformer, equipped with bushing insulators 48 and 49. The bushings are equipped with shield taps 50 and 51 and the connections are shown as arranged for measuring the power factor of the apparatus and its housing separately from that of the bushing and also the power factor of the bushing 49 separately from the apparatus. Of course, the connection can be changed to measure the power factor of the other bushing also by transferring the connections. The power factor meter comprises a charging transformer 52 an ammeter 53, a voltmeter 54, a wattmeter 55 and a two pole, double throw switch 56. The transformer is connected to the bushing conductor 57 by a lead 58 having a conductor shield 59. With the two upper blades of the switch 56 closed and the two lower blades open, the charging current for the apparatus passes through the instruments 53 and 55, but the charging currents of the bushings is shunted to the shield 59 and does not influence the instrument readings. In this way the power factor of the apparatus can be measured accurately independently of the bushing. When the two top blades of the switch are open and the two bottom blades closed, the charging current for the bushing will pass through the instruments and the charging current for the apparatus will be shunted to the shield 59 so that the instruments will show the power factor of the bushing independently of the apparatus. The only source of error to this scheme will be due to any external leakage current over the upper porcelain bushing cones. However, if the bushings are thoroughly cleaned and dry before these tests, the effect of this external leakage current can be made negligible. The invention is of course not limited to the particular power factor test method shown, but any suitable method and apparatus for measuring power factor may be substituted.

I claim:

1. Testing apparatus for insulation comprising a pair of spaced conductor elements separated by the insulation to be tested and arranged to receive an alternating charge, a capacitor shield interposed between a portion of said insulation and one of said conductor elements, a portion of said insulation forming a housing for said shield, a measuring instrument electrically connected between said shield and said last named element so that the charging current of the capacitor formed by said insulation and elements passes through said measuring instrument and means for directing through said instrument, leakage current over said housing, said directing means and the surface of said housing being arranged in a leakage path separate from said shield and in shunt with the capacitance path of which said shield is a part.

2. The combination with a bushing insulator having a grounded support, a conductor, a pair of dielectric shells separating said conductor from said support and supplemental insulation interposed between said conductor and support, of a capacitor shield interposed between said supplemental insulation and said support and insulated from said support, means for connecting a measuring instrument between said capacitor shield and ground and means for directing the leakage current over said dielectric shells, through said measuring instrument.

3. The combination with a bushing insulator comprising a grounded support, a conductor and a dielectric shell for insulating said conductor from said support, of a collector ring on the inner surface of said shell adjacent said support but insulated from said support, for intercepting leakage current over said shell and means for electrically connecting a measuring instrument between said ring and ground.

4. The combination with a bushing insulator comprising a supporting flange, a conductor extending through said flange, a pair of dielectric shells interposed between said conductor and flange, and supplemental insulation surrounding said conductor and interposed between said conductor and flange, of a capacitor shield interposed between said supplemental insulation and said flange and insulated from said flange, a band of conducting material on the surface of each of said shells adjacent said flange, but insulated from said flange, shield tap conductor jumpers connecting said tap conductor with said bands and with said capacitor shield and means for connecting a measuring instrument in series with said jumper to measure the combined leakage and charging currents of said bushing.

5. The combination with the conductors of a polyphase electric system, of insulators for said conductors each having spaced electrodes, a dielectric member interposed between said electrodes and forming therewith a capacitance coupling, a dielectric housing for said interposed dielectric member, means for combining the charging currents for the capacitance couplings of all of said insulators and the leakage currents over the dielectric housings of all of said insulators and means for measuring said resultant of the charging and leakage currents for said insulators to indicate the condition of said insulators.

6. The combination with the conductors of a polyphase electric system, of bushing insulators, one for each of said conductors, capacitor shields for collecting the charging currents of said respective insulators, means for connecting said capacitor shields to a common conductor, means for connecting said common conductor in series with the leakage paths over said insulators and means for connecting a measuring instrument between said common conductor and ground to measure the resultant charging and leakage current for said bushing insulators.

7. The combination with the conductors of a polyphase electric system, of bushing insulators, one for each phase of said system, each insulator having a grounded support, a capacitor shield interposed between the grounded support and a portion of the insulation of each bushing insulator, means forming a leakage path over each insulator separated from the capacitor shield thereof, means for connecting said capacitor shields to a common conductor, means for directing the leakage currents from said leakage paths of all of said insulators to said common conductor and means for connecting a measuring instrument between said common conductor and ground to indicate any unbalanced condition of insulation of said bushing insulators.

8. The combination with the conductors of a polyphase electric system, of a plurality of bushing insulators, one for each conductor, each insulator comprising a grounded support surrounding its conductor, dielectric shells separating said grounded support from said conductor, supplemental insulation between each conductor and its grounded support, a capacitor shield interposed between the supplemental insulation of each insulator and its grounded support for collecting the charging current for said insulator, means for collecting leakage currents over the surfaces of said shells, means for connecting the leakage current collectors and the capacitor shields of the several bushings to a common conductor and an instrument electrically connected between said common conductor and ground for measuring the resultant charging and leakage currents of said several bushing insulators.

9. The combination with the conductors of a polyphase electric system, of insulators for said conductors, means for directing the charging currents for said insulators through a common conductor to ground, and an indicator electrically connected between said common conductor and ground for continuously indicating the relative balance of said insulator.

10. The combination with the conductors of a polyphase electric system, of bushing insulators for said conductors, means for directing the charging and leakage currents of said insulators through a common conductor to ground and an indicator electrically connected between said common conductor and ground for continuously indicating the relative balance of said insulators.

11. The combination with a bushing insulator comprising a grounded support, a conductor extending through said support, a pair of dielectric shells separating said conductor from said support, and a ground sleeve interposed between said support and one of said shells and insulated from said support of means for connecting an electrical instrument between said ground sleeve and ground to measure the leakage current passing over said last named shell to ground.

12. The method of testing insulators having dielectric shell members forming housings, said method comprising the steps of combining the charging and leakage currents, including the leakage currents over the inner surfaces of said housings, of a plurality of insulators each connected with a different phase of a polyphase electric system and, while all of said insulators are subject to substantially the same voltage, observing variations from normal of the resultant of said currents due to an unbalance in the leakage currents of said insulators.

13. The method of testing the insulation of bushing insulators having dielectric shell members forming housings, said method comprising the steps of subjecting a plurality of bushing insulators to the voltage of the respective phases of a polyphase system, combining the leakage and charging currents of each bushing insulator, including the leakage currents over the inner surfaces of said housings, while all of the insulators are subjected to the normal, equal voltages of their respective phases, and measuring the vector sum of the several resultant currents from all of said bushings to detect any unbalance in the leakage currents of the several bushings.

14. The combination with a conductor, of a bushing insulator for said conductor, said bushing insulator having a capacitance member forming a capacitance coupling with said conductor, a translating device connected with said capacitance member to be energized by the charging current of said capacitance coupling, a measuring instrument, means for opening the circuit of said translating device and for connecting said measuring instrument between said capacitance member and ground, and means for combining the leakage current of said bushing insulator with the current from said capacitance member passing through said measuring instrument so that said measuring instrument will be energized by the vector sum of the leakage and charging currents of said bushing insulator.

RALPH HIGGINS.